US006543871B1

(12) United States Patent
Rosen et al.

(10) Patent No.: US 6,543,871 B1
(45) Date of Patent: Apr. 8, 2003

(54) MASK GENERATOR AND IMAGE MASK PATTERNS

(75) Inventors: Ziv Rosen, Foster City, CA (US); Chandan Mishra, Belmont, CA (US)

(73) Assignee: Electronics for Imaging, Inc., Foster City, CA (US)

( * ) Notice: Subject to any disclaimer, the term of this patent is extended or adjusted under 35 U.S.C. 154(b) by 0 days.

(21) Appl. No.: 09/721,548

(22) Filed: Nov. 21, 2000

(51) Int. Cl.$^{7}$ .............................. B41J 2/21; B41J 2/205
(52) U.S. Cl. .............................. 347/15; 347/43
(58) Field of Search ..................... 347/15, 43; 358/447, 358/448, 1.9

(56) References Cited

U.S. PATENT DOCUMENTS

| | | | | |
|---|---|---|---|---|
| 5,041,849 A | | 8/1991 | Quate et al. | 346/140 |
| 5,604,520 A | | 2/1997 | Matsubara et al. | 347/43 |
| 5,677,716 A | | 10/1997 | Cleveland | 347/37 |
| 5,818,474 A | | 10/1998 | Takahashi et al. | 347/15 |
| 5,883,644 A | | 3/1999 | Nicoloff, Jr. et al. | 347/12 |
| 5,923,349 A | | 7/1999 | Meyer | 347/42 |
| 5,969,729 A | | 10/1999 | Ericson et al. | 347/9 |
| 6,179,407 B1 | * | 1/2001 | Bockman | 347/15 |
| 6,183,055 B1 | * | 2/2001 | Kanematsu et al. | 347/9 |
| 6,250,739 B1 | | 6/2001 | Serra | |
| 6,310,640 B1 | | 10/2001 | Askeland | |

FOREIGN PATENT DOCUMENTS

| | | | |
|---|---|---|---|
| EP | 864 429 | 9/1998 | B41J/2/21 |
| EP | 911 753 | 4/1999 | G06K/15/10 |
| EP | 730 968 | 5/1999 | B41J/2/21 |
| EP | 718 105 | 8/1999 | B41J/2/21 |
| EP | 944 024 | 9/1999 | G06K/15/10 |

* cited by examiner

*Primary Examiner*—Thinh Nguyen

(57) ABSTRACT

A method and apparatus for employing print mode techniques to optimize image quality, throughput speed and reliability, including generating pseudo-random printmasks to minimize banding, bleeding, blocking, and other undesirable printing artifacts, and combining random selection of a pass number for printing each pixel of a printmask with application of various constraints. In combination with other aspects of the invention, speed is optimized by depositing substantially a single drop of ink per pixel, thereby minimizing both the number of passes required to render all pixels completely and drying time. Image quality is optimized by maximizing the time and distance between deposition of individual ink drops, thereby minimizing coalescence, bleeding, cockling, blocking, pen temperature, and pen-firing frequency which affect uniformity and consistency of ink drop size. Reliability and durability are optimized by maintaining pen-firing frequency and carriage velocity below maximum limits set by manufacturers thereof.

11 Claims, 20 Drawing Sheets

|       | Col. 1 | Col. 2 | Col. 3 | Col. 4 | Col. 5 |
|-------|--------|--------|--------|--------|--------|
| Row 1 | 2      |        |        |        |        |
| Row 2 |        |        |        |        |        |

Mask 1

|       | Col. 1 | Col. 2 | Col. 3 | Col. 4 | Col. 5 |
|-------|--------|--------|--------|--------|--------|
| Row 1 |        |        |        |        |        |
| Row 2 |        |        |        |        |        |

Mask 2

| 2 |  |  |  |  |
|---|--|--|--|--|
|   |  |  |  |  |

Table of Pass #'s Attempted at Each Pixel of Mask 1

|  |  |  |  |  |
|--|--|--|--|--|
|  |  |  |  |  |

Table of Pass #'s Attempted at Each Pixel of Mask 2

| | Col. 1 | Col. 2 | Col. 3 | Col. 4 | Col. 5 |
|---|---|---|---|---|---|
| Row 1 | 2 | 1 | | | |
| Row 2 | | | | | |

Mask 1

| | Col. 1 | Col. 2 | Col. 3 | Col. 4 | Col. 5 |
|---|---|---|---|---|---|
| Row 1 | | | | | |
| Row 2 | | | | | |

Mask 2

| | | | | |
|---|---|---|---|---|
| 2 | 1 | | | |
| | | | | |

Table of Pass #'s Attempted at Each Pixel of Mask 1

| | | | | |
|---|---|---|---|---|
| | | | | |
| | | | | |

Table of Pass #'s Attempted at Each Pixel of Mask 2

*FIG. 4B*

|        | Col. 1 | Col. 2 | Col. 3 | Col. 4 | Col. 5 |
|--------|--------|--------|--------|--------|--------|
| Row 1  | 2      | 1      | 2      |        |        |
| Row 2  |        |        |        |        |        |

Mask 1

|   |   |
|---|---|
|   |   |
| 1 | 2 |
| 1 |   |
| 2 |   |

Table of Pass #'s Attempted at Each Pixel of Mask 1

|        | Col. 1 | Col. 2 | Col. 3 | Col. 4 | Col. 5 |
|--------|--------|--------|--------|--------|--------|
| Row 1  |        |        |        |        |        |
| Row 2  |        |        |        |        |        |

Mask 2

|   |   |
|---|---|
|   |   |
|   |   |
|   |   |
|   |   |
|   |   |

Table of Pass #'s Attempted at Each Pixel of Mask 2

| | Col. 1 | Col. 2 | Col. 3 | Col. 4 | Col. 5 |
|---|---|---|---|---|---|
| Row 1 | 2 | 1 | 2 | 3 | |
| Row 2 | | | | | |

Mask 1

| | Col. 1 | Col. 2 | Col. 3 | Col. 4 | Col. 5 |
|---|---|---|---|---|---|
| Row 1 | | | | | |
| Row 2 | | | | | |

Mask 2

| | | | | |
|---|---|---|---|---|
| 2 | 1 | 1<br>2 | 3 | |
| | | | | |

Table of Pass #'s Attempted at Each Pixel of Mask 1

| | | | | |
|---|---|---|---|---|
| | | | | |
| | | | | |

Table of Pass #'s Attempted at Each Pixel of Mask 2

*FIG. 4D*

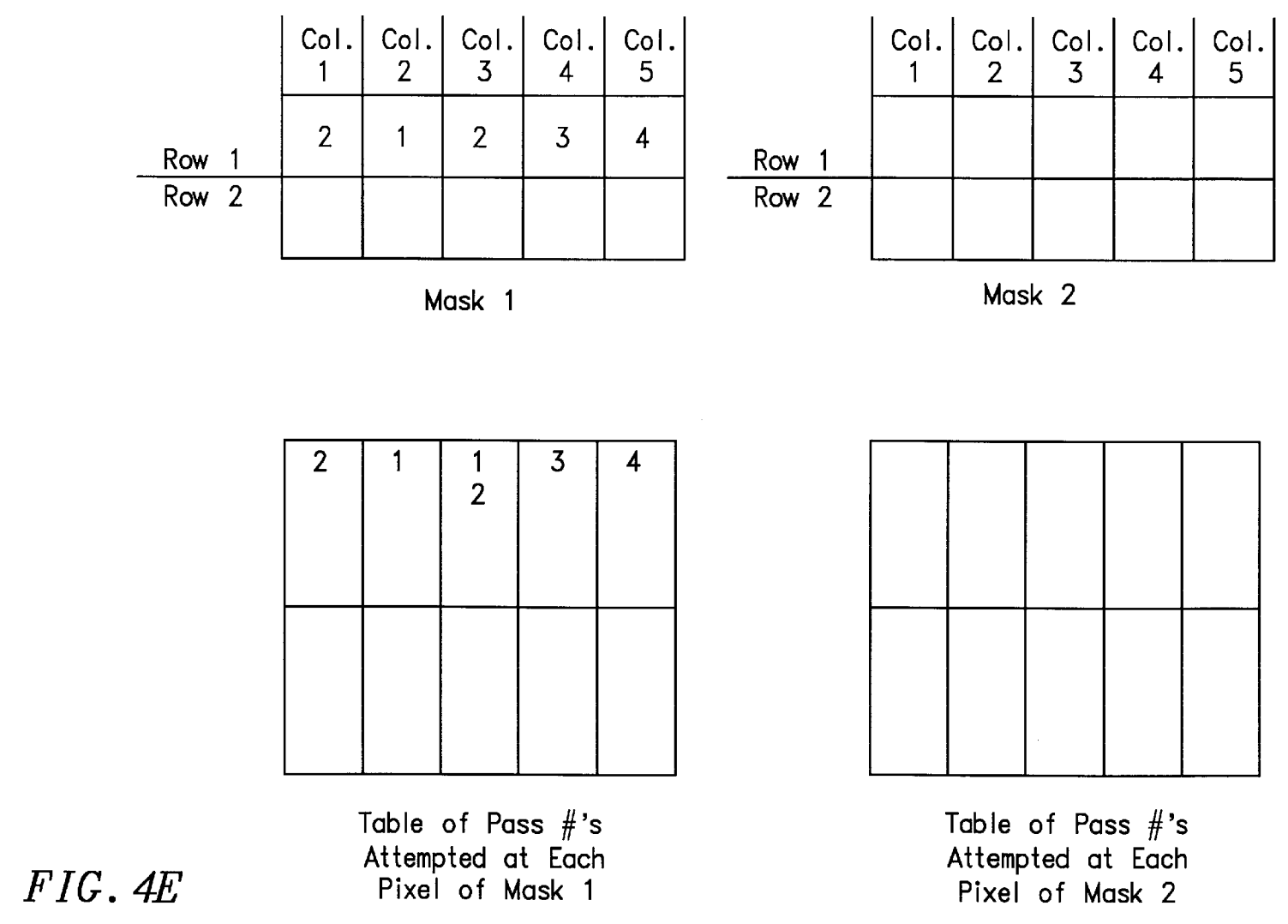

| | Col. 1 | Col. 2 | Col. 3 | Col. 4 | Col. 5 |
|---|---|---|---|---|---|
| Row 1 | 2 | 1 | 2 | 3 | 4 |
| Row 2 | | | | | |

Mask 1

| | Col. 1 | Col. 2 | Col. 3 | Col. 4 | Col. 5 |
|---|---|---|---|---|---|
| Row 1 | | | | | |
| Row 2 | | | | | |

Mask 2

| | | | | |
|---|---|---|---|---|
| 2 | 1 | 1<br>2 | 3 | 4 |
| | | | | |

Table of Pass #'s Attempted at Each Pixel of Mask 1

| | | | | |
|---|---|---|---|---|
| | | | | |
| | | | | |

Table of Pass #'s Attempted at Each Pixel of Mask 2

*FIG. 4E*

| | Col. 1 | Col. 2 | Col. 3 | Col. 4 | Col. 5 |
|---|---|---|---|---|---|
| Row 1 | 2 | 1 | 2 | 3 | 4 |
| Row 2 | 3 | | | | |

Mask 1

| | Col. 1 | Col. 2 | Col. 3 | Col. 4 | Col. 5 |
|---|---|---|---|---|---|
| Row 1 | | | | | |
| Row 2 | | | | | |

Mask 2

| | | | | |
|---|---|---|---|---|
| 2 | 1 | 1<br>2 | 3 | 4 |
| 3 | | | | |

Table of Pass #'s Attempted at Each Pixel of Mask 1

| | | | | |
|---|---|---|---|---|
| | | | | |
| | | | | |

Table of Pass #'s Attempted at Each Pixel of Mask 2

*FIG. 4F*

| | Col. 1 | Col. 2 | Col. 3 | Col. 4 | Col. 5 |
|---|---|---|---|---|---|
| Row 1 | 2 | 1 | 2 | 3 | 4 |
| Row 2 | 3 | 4 | | | |

Mask 1

| | Col. 1 | Col. 2 | Col. 3 | Col. 4 | Col. 5 |
|---|---|---|---|---|---|
| Row 1 | | | | | |
| Row 2 | | | | | |

Mask 2

| | | | | |
|---|---|---|---|---|
| 2 | 1 | 1<br>2 | 3 | 4 |
| 3 | 2<br>1<br>3<br>4 | | | |

Table of Pass #'s Attempted at Each Pixel of Mask 1

| | | | | |
|---|---|---|---|---|
| | | | | |
| | | | | |

Table of Pass #'s Attempted at Each Pixel of Mask 2

*FIG. 4G*

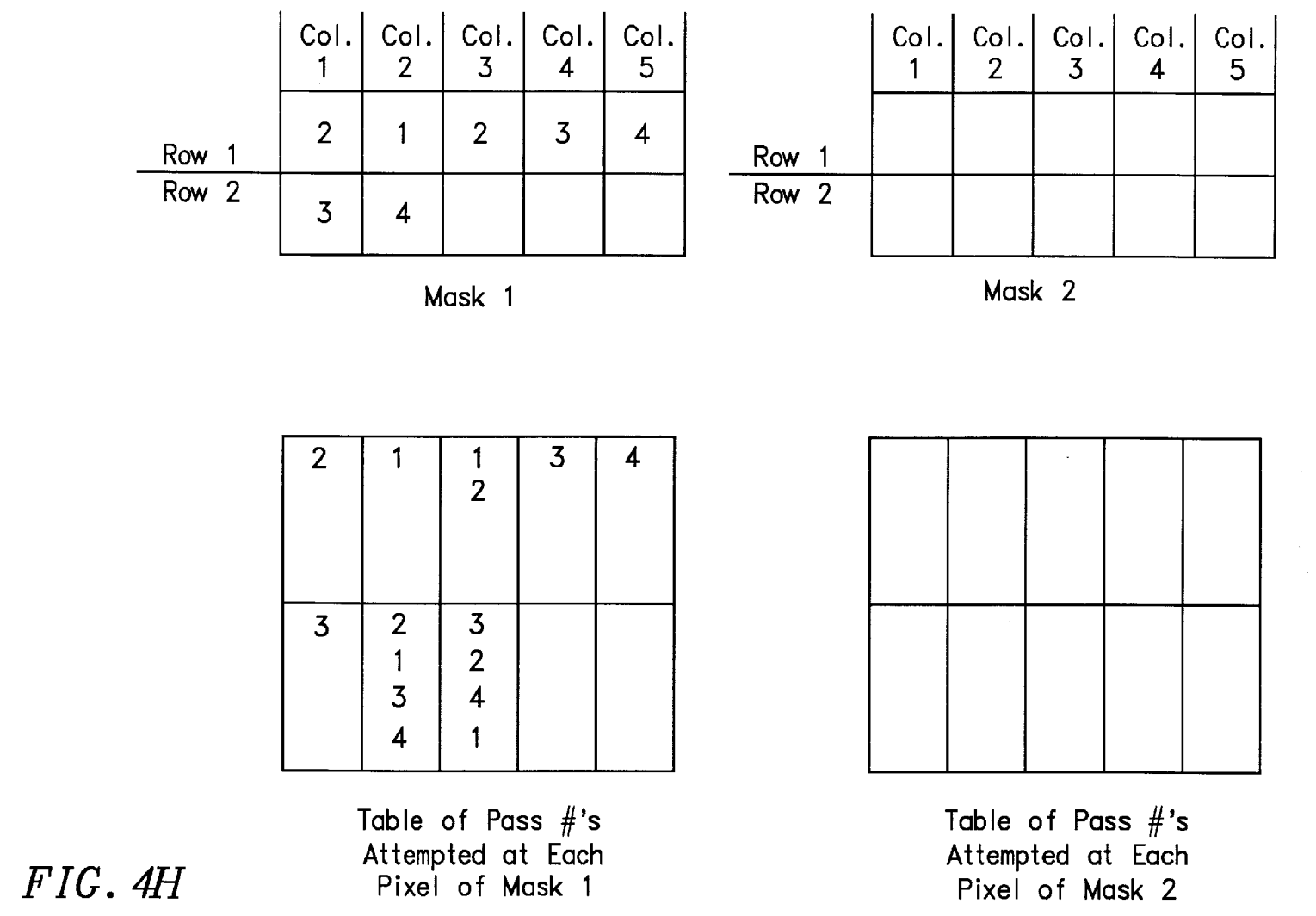

| | Col. 1 | Col. 2 | Col. 3 | Col. 4 | Col. 5 |
|---|---|---|---|---|---|
| Row 1 | 2 | 1 | 2 | 3 | 4 |
| Row 2 | 3 | 4 | | | |

Mask 1

| | Col. 1 | Col. 2 | Col. 3 | Col. 4 | Col. 5 |
|---|---|---|---|---|---|
| Row 1 | | | | | |
| Row 2 | | | | | |

Mask 2

| | | | | |
|---|---|---|---|---|
| 2 | 1 | 1<br>2 | 3 | 4 |
| 3 | 2<br>1<br>3<br>4 | 3<br>2<br>4<br>1 | | |

Table of Pass #'s Attempted at Each Pixel of Mask 1

| | | | | |
|---|---|---|---|---|
| | | | | |
| | | | | |

Table of Pass #'s Attempted at Each Pixel of Mask 2

*FIG. 4H*

| | Col. 1 | Col. 2 | Col. 3 | Col. 4 | Col. 5 |
|---|---|---|---|---|---|
| Row 1 | 2 | 1 | 2 | 3 | 4 |
| Row 2 | 3 | | | | |

Mask 1

| | Col. 1 | Col. 2 | Col. 3 | Col. 4 | Col. 5 |
|---|---|---|---|---|---|
| Row 1 | | | | | |
| Row 2 | | | | | |

Mask 2

| | | | | |
|---|---|---|---|---|
| 2 | 1 | 1<br>2 | 3 | 4 |
| 3 | 2<br>1<br>3<br>4 | | | |

Table of Pass #'s Attempted at Each Pixel of Mask 1

| | | | | |
|---|---|---|---|---|
| | | | | |
| | | | | |

Table of Pass #'s Attempted at Each Pixel of Mask 2

*FIG. 4I*

| | Col. 1 | Col. 2 | Col. 3 | Col. 4 | Col. 5 |
|---|---|---|---|---|---|
| Row 1 | 2 | 1 | 2 | 3 | 4 |
| Row 2 | 4 | | | | |

Mask 1

| | Col. 1 | Col. 2 | Col. 3 | Col. 4 | Col. 5 |
|---|---|---|---|---|---|
| Row 1 | | | | | |
| Row 2 | | | | | |

Mask 2

| | | | | |
|---|---|---|---|---|
| 2 | 1 | 1<br>2 | 3 | 4 |
| 3<br>4 | | | | |

Table of Pass #'s Attempted at Each Pixel of Mask 1

| | | | | |
|---|---|---|---|---|
| | | | | |
| | | | | |

Table of Pass #'s Attempted at Each Pixel of Mask 2

*FIG. 4J*

| | Col. 1 | Col. 2 | Col. 3 | Col. 4 | Col. 5 |
|---|---|---|---|---|---|
| Row 1 | 2 | 1 | 2 | 3 | 4 |
| Row 2 | 4 | 3 | | | |

Mask 1

| | Col. 1 | Col. 2 | Col. 3 | Col. 4 | Col. 5 |
|---|---|---|---|---|---|
| Row 1 | | | | | |
| Row 2 | | | | | |

Mask 2

| | | | | |
|---|---|---|---|---|
| 2 | 1 | 1<br>2 | 3 | 4 |
| 3<br>4 | 2<br>1<br>4<br>3 | | | |

Table of Pass #'s Attempted at Each Pixel of Mask 1

| | | | | |
|---|---|---|---|---|
| | | | | |
| | | | | |

Table of Pass #'s Attempted at Each Pixel of Mask 2

*FIG. 4K*

| | Col. 1 | Col. 2 | Col. 3 | Col. 4 | Col. 5 |
|---|---|---|---|---|---|
| Row 1 | 2 | 1 | 2 | 3 | 4 |
| Row 2 | 4 | 3 | 4 | | |

Mask 1

| | Col. 1 | Col. 2 | Col. 3 | Col. 4 | Col. 5 |
|---|---|---|---|---|---|
| Row 1 | | | | | |
| Row 2 | | | | | |

Mask 2

| | | | | |
|---|---|---|---|---|
| 2 | 1 | 1<br>2 | 3 | 4 |
| 3<br>4 | 2<br>1<br>4<br>3 | 1<br>2<br>3<br>4 | | |

Table of Pass #'s Attempted at Each Pixel of Mask 1

| | | | | |
|---|---|---|---|---|
| | | | | |
| | | | | |

Table of Pass #'s Attempted at Each Pixel of Mask 2

*FIG. 4L*

| | Col. 1 | Col. 2 | Col. 3 | Col. 4 | Col. 5 |
|---|---|---|---|---|---|
| Row 1 | 2 | 1 | 2 | 3 | 4 |
| Row 2 | 4 | 3 | 4 | 1 | 2 |

Mask 1

| | Col. 1 | Col. 2 | Col. 3 | Col. 4 | Col. 5 |
|---|---|---|---|---|---|
| Row 1 | | | | | |
| Row 2 | | | | | |

Mask 2

| | | | | |
|---|---|---|---|---|
| 2 | 1 | 1<br>2 | 3 | 4 |
| 3<br>4 | 2<br>1<br>4<br>3 | 1<br>2<br>3<br>4 | 1 | 2 |

Table of Pass #'s Attempted at Each Pixel of Mask 1

| | | | | |
|---|---|---|---|---|
| | | | | |
| | | | | |

Table of Pass #'s Attempted at Each Pixel of Mask 2

FIG. 4M

| | Col. 1 | Col. 2 | Col. 3 | Col. 4 | Col. 5 |
|---|---|---|---|---|---|
| Row 1 | 2 | 1 | 2 | 3 | 4 |
| Row 2 | 4 | 3 | 4 | 1 | 2 |

Mask 1

| | Col. 1 | Col. 2 | Col. 3 | Col. 4 | Col. 5 |
|---|---|---|---|---|---|
| Row 1 | 1 | | | | |
| Row 2 | | | | | |

Mask 2

| | | | | |
|---|---|---|---|---|
| 2 | 1 | 1<br>2 | 3 | 4 |
| 3<br>4 | 2<br>1<br>4<br>3 | 1<br>2<br>3<br>4 | 1 | 2 |

Table of Pass #'s Attempted at Each Pixel of Mask 1

| | | | | |
|---|---|---|---|---|
| 2<br>4<br>1 | | | | |
| | | | | |

Table of Pass #'s Attempted at Each Pixel of Mask 2

*FIG. 4N*

MASK GENERATOR AND IMAGE MASK PATTERNS

BACKGROUND OF THE INVENTION

1. Field of the Invention

The invention relates generally to methods and apparatus for incremental printing of images or text on printing media such as paper, transparency stock, or other glossy media. More particularly, the invention relates to methods and apparatus that construct images or text from individual ink drops deposited on a printing medium in a two-dimensional pixel array.

2. Description of Prior Art

In the prior art of inkjet printers there is an inverse relationship between printed image quality and speed, such that the higher the quality of a printed image the lower the throughput speed, and vice versa. At the same time, there has been a direct correlation of high quality and high speed with high cost. The tradeoff between image quality, throughput speed, and cost has been the fundamental dilemma in design and construction of printers.

An image formed by an inkjet printer is built up incrementally on the surface of a recording medium from a myriad of dots of ink.

Unfortunately, there has been a persistent problem with undesirable visual artifacts which result from the process of such incremental printing.

Many attempts have been made in prior art to minimize or avoid incremental printing artifacts through mask design. It is known throughout the industry that the quality of the masks has an immediate and a very visible effect on quality of the output. In certain industries and markets, such as publishing and graphic design, not having any visible artifact from the way the image was printed, and uniformity of color, is essential. Such industries also are at the cutting edge of the use of large- and wide-format color printers, in which artifacts of incremental printing with masks are particularly noticeable, especially when attempting to achieve photographic-quality printed images.

In general, the more regular and uniform the mask the more the artifacts, so various attempts have been made in prior art to introduce randomness, or at least pseudo-randomness, in generation of masks and in printing with the use of masks. Previously, the improvement available through randomization has been limited because printmasks were only effective at reducing undesirable artifacts within the dimensions of each individual mask. Such printmasks are necessarily replicated horizontally across the image and vertically down the image. The result has often been a repeating pattern artifact resembling a grid that is especially apparent in midtones.

Another repeating pattern artifact is known as "banding," in which horizontal bands are apparent where printed swaths abut. Although it is known that some banding artifacts can be reduced by printing highly staggered/overlapping bands, doing so reduces overall throughput proportionately.

In addition, to achieve good tonal gradations and/or vivid colors, and to substantially fill the space between addressable pixel locations, sufficient quantities of colorant must be deposited. After being deposited, however, some period of time is generally required for removal of the water or other base from the colorant, for instance by evaporation and, for some print media, absorption. If too much colorant is deposited this "drying" period can be unduly time long.

Further, if a large amount of colorant is deposited all at substantially the same time within each section of an image, other related adverse bulk-colorant effects arise. These include so-called "bleeding" of colors into each other (especially noticeable at color boundaries that should be sharp), "cockle" or puckering of the printing medium, "smudging" if the printed image is handled before it is dry, and "blocking" or transfer of colorant from one printed image onto the back of an adjacent sheet. In extreme cases such blocking can cause two sheets to stick together, or one sheet to a slipcover used to protect the imaged sheet, or even one sheet to components of the printer.

Ironically, many attempts to solve banding and liquid-loading problems actually contributed to pattern artifacts. Printmode techniques are all highly systematic and repetitive, and thus vulnerable to patterning defects. For example, some printmodes such as square or rectangular checkerboard-like patterns tend to create objectionable pattern effects when frequencies or harmonics generated within the patterns are close to the frequencies or harmonics of interacting subsystems. Such interfering frequencies may arise in dithering subsystems sometimes used to help control the paper advance or the pen speed.

Pixel structures called "superpixels" have previously been used in the early image-processing stages for various purposes. However, in all known uses of superpixels, the superpixel selection for each situation is repetitive and consistent, not random. The same is true of dither cells, generally used in the rendition stage to produce a random appearance. Their cells, like random printmasks are randomly or pseudo-randomly derived, but once derived are used repetitively, and are therefore prone to periodic and/or pattern defects.

Even with spatial dithering, or for continuous-tone input images error diffusion, heretofore some patterning persists even in images printed under conditions which should yield the highest possible image quality. It has been suggested that in theory such patterning cannot be eliminated through dither or error-diffusion redesign exclusively, and that further improvement in image quality must be sought elsewhere (see, for example, EP 0 718 105 B1, in the name of Yen et al., U.S. patent application Ser. No. 363,447).

The persistent problems outlined above, balanced against pervasive concerns of throughput, reliability and cost have continued to impede optimization of inkjet printing. Repetitive pattern artifacts arising from systematic dot-placement errors, even in the presence of internally randomized printmask patterns, have continued to impede such optimization of high quality inkjet printing at high throughput rates on all printing media for a competitive price. Thus important aspects of the technology used in the field of the invention remain amenable to useful refinement. What is needed is a technique for introducing as much randomness as possible in generating masks to minimize artifacts of incremental printing, combined with selection of various constraints to optimize speed for a selected level of quality.

SUMMARY OF THE INVENTION

The invention disclosed herein overcomes the limitations of prior art by providing a pseudo-random approach to mask production, combining random selection of a pass number for printing each pixel of a mask with application of various constraints to optimize quality, throughput speed and reliability. Along with other factors discussed more fully below, speed is optimized by depositing substantially a single drop of ink per pixel, thereby minimizing both the number of passes required to completely render all pixels and the drying time; image quality is optimized by maximizing the time and distance between deposition of individual ink drops, thereby minimizing coalescence, bleeding, cockling, blocking, pen temperature and pen-firing frequency (which affect uniformity and consistency of ink drop size); and, reliability and durability are optimized by maintaining pen-firing frequency and carriage velocity below maximum limits set by manufacturers thereof.

DETAILED DESCRIPTION OF THE INVENTION

For purposes of the discussion herein, the terms "printer" and "plotter" are used interchangeably.

Figure 1:
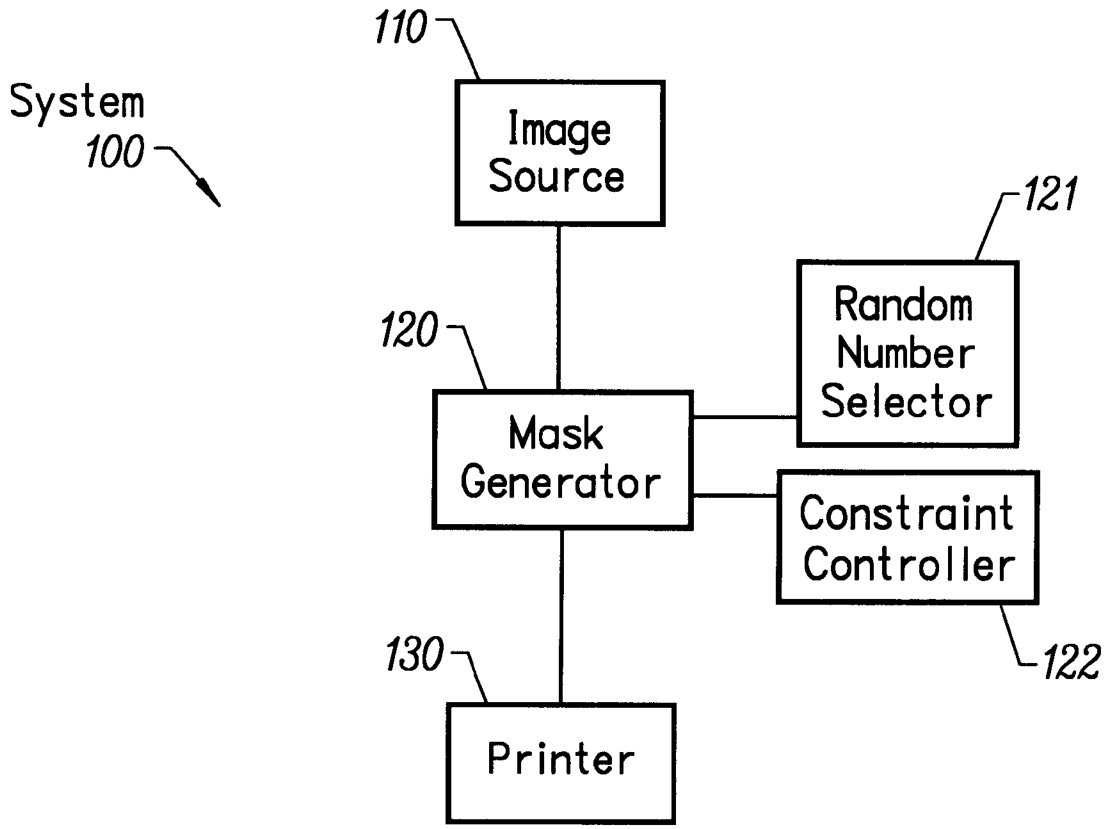
FIG. 1 is a block schematic diagram showing an exemplary system embodiment of the invention.

FIG. 1 is a block schematic diagram that represents an exemplary system embodiment of the invention. The system is referred to herein by the general reference number 100.

System 100 is comprised generally of image source 110, mask generator 120 and printer 130, coupled via means known in the art including, without limitation, hard wiring such as metallic conductors or fiber optics, electromagnetic radiation such as visible light, laser, infrared, ultraviolet, microwave, radio frequency, or other suitable means of coupling.

Although FIG. 1 shows only a single image source 110, a single mask generator 120 and a single printer 130, in actual practice any number of image sources 110, mask generators 120 and printers 130 may coupled.

Image source 110 may comprise, without limitation, a computer, a scanner, a facsimile machine, a web-enabled device or other suitable means for providing an image. Image source 110 provides image data to mask generator 120, preferably in the form of binary data such as a bit map, but alternatively in any suitable form capable of being received and processed by mask generator 120.

Mask generator 120 includes random number selector 121 and constraint controller 122. Mask generator 120 preferably comprises software. In alternative embodiments mask generator 120 may comprise firmware or an ASIC, or other suitable hardware or software means for generating masks.

Mask generator 120 receives image data from image source 110, generates masks from the image data using random numbers received from random number selector 121 and constraints from constraint controller 122, and sends the completed masks to printer 130 for printing on media.

Random number selector 121 is any conventional means of generating random numbers or such as may be known in the future, such that as more nearly perfect random number generators are developed they may be incorporated into the invention. Random number selector 121 is preferably a module of mask generator 120 software. In alternative embodiments random number selector 121 may comprise firmware or an ASIC, or other suitable hardware or software means for randomly selecting numbers. Mask generator 120 sends a request for a random number to random number selector 121, which randomly selects a number and provides it to mask generator 120. Linkage of the range of all possible random numbers and the range of the number of passes selected may be by means of a mathematical hash function, or any other suitable hardware or software means of achieving such linkage.

Constraint controller 122 may comprise a module of mask generator 120 software. In alternative embodiments constraint controller 122 may comprise firmware or an ASIC, or other suitable hardware or software means for adjustably controlling constraints selected by one or more operators. Constraint controller 122 is preferably provided with means for setting and adjusting one or more of the following parameters and constraints:

- Page dimensions;
- Media type;
- Resolution;
- Mask dimensions;
- Number of passes;
- Pass minimum time;
- Pass density;
- Pass advance (number of rows to advance after each pass)
- Carriage velocity;
- Ink type;
- Ink drying time;
- Swath delay time;
- Swath overlap;
- Swath interleaving;
- Passes per swath;
- Unidirectional or bidirectional passes;
- Time period between inking of adjacent pixels;
- Horizontal, vertical and diagonal spacing of dots printed in a single pass, both within a mask and at boundaries where masks in a row abut each other;
- Maximum pen-firing frequency;
- Pen temperature;
- Number of colors printed in a single pass;
- Advancing and retracting a page for extended drying time between passes;
- Firing of individual nozzles of pens to spread use evenly;

Operator control and adjustment of these constraints allows total control and customization so that optimal masks can be generated for virtually any application, to accommodate any media type and any apparatus.

Preferably, quality constraints may be overridden when necessary or desired by using fuzzy logic or any other suitable technique and a selected prioritization of quality constraints, but physical constraints such as maximum pen-firing frequency and carriage velocity cannot.

Printer 130 comprises, without limitation, any sort of apparatus which can incrementally produce a hard copy of an image or text by depositing "ink" on a "page", including but not limited to, any conventional computer peripheral printers, graphics plotters, copiers, facsimile machines or any other suitable means for printing.

Image source 110, and mask generator 120 with random number selector 121 and constraint controller 122, may be co-located with or be separate from printer 130, so that image processing and mask generation can be performed offline, thereby distributing memory and processor requirements and reducing such requirements for the printer 130. This configuration is particularly advantageous in a networked environment, where memory and processor requirements are proportionately greater according to the number of network users and thus more likely to either overload the more limited memory and processor capacity of a typical printer, or require that an inordinately large and expensive amount of memory and processor capacity be built into the printer 130. In addition, distributed memory and processing is more easily and inexpensively scalable as a network is expanded.

The word "ink" is used generically herein, and refers to any suitable colorant which is or can be used by a "printer" to form an image on a "page", including but not limited to, dye-based inks, UV based inks, dyes, liquid or dry toners, pigments, powders, glazes, paints or any other suitable colorant.

The word "page" is used generically herein, and refers to any sort of media upon which a "printer" can deposit "ink" to form an image or text, including but not limited to, paper, transparency stock, polymers or plastics such as mylar, cloth or woven materials such as linen, metals, ceramics or any oither suitable media.

FIG. 3*a* through FIG. 3*d* show, as examples only and without limitation, four masks generated pursuant to the method disclosed herein for an image to be printed in four passes using four colors (cyan, magenta, yellow and black). Each of the four masks shown is used for each of the four colors, one mask per color per pass, and the masks are then rotated to another color for the next pass, until all four colors have been printed in four passes. As an example: on the first pass, the mask of FIG. 3*a* may be used for cyan, the mask of FIG. 3*b* for magenta, the mask of FIG. 3*c* for yellow, and the mask of FIG. 3*d* for black; on the second pass, the mask of FIG. 3*b* may be used for cyan, the mask of FIG. 3*c* for magenta, the mask of FIG. 3*d* for yellow, and the mask of FIG. 3*a* for black; and so on.

Figure 2:
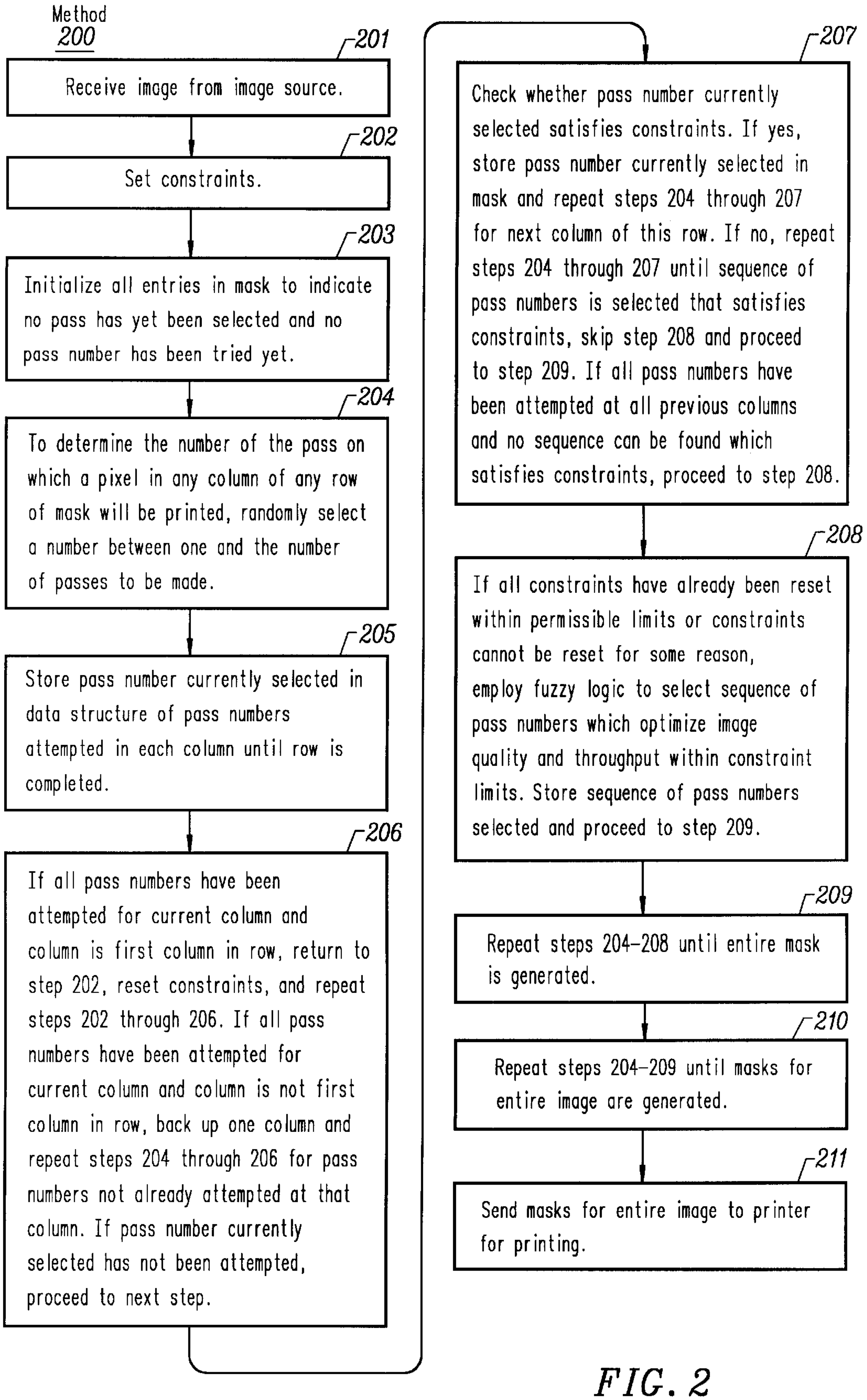
FIG. 2 is a flow diagram showing an exemplary method embodiment of the invention; and, FIG. 3*a* through FIG. 3*d* show, as examples only and without limitation, four masks generated pursuant to the method disclosed herein for an image to be printed in four passes using four colors (cyan, magenta, yellow and black).
Figure 3A:
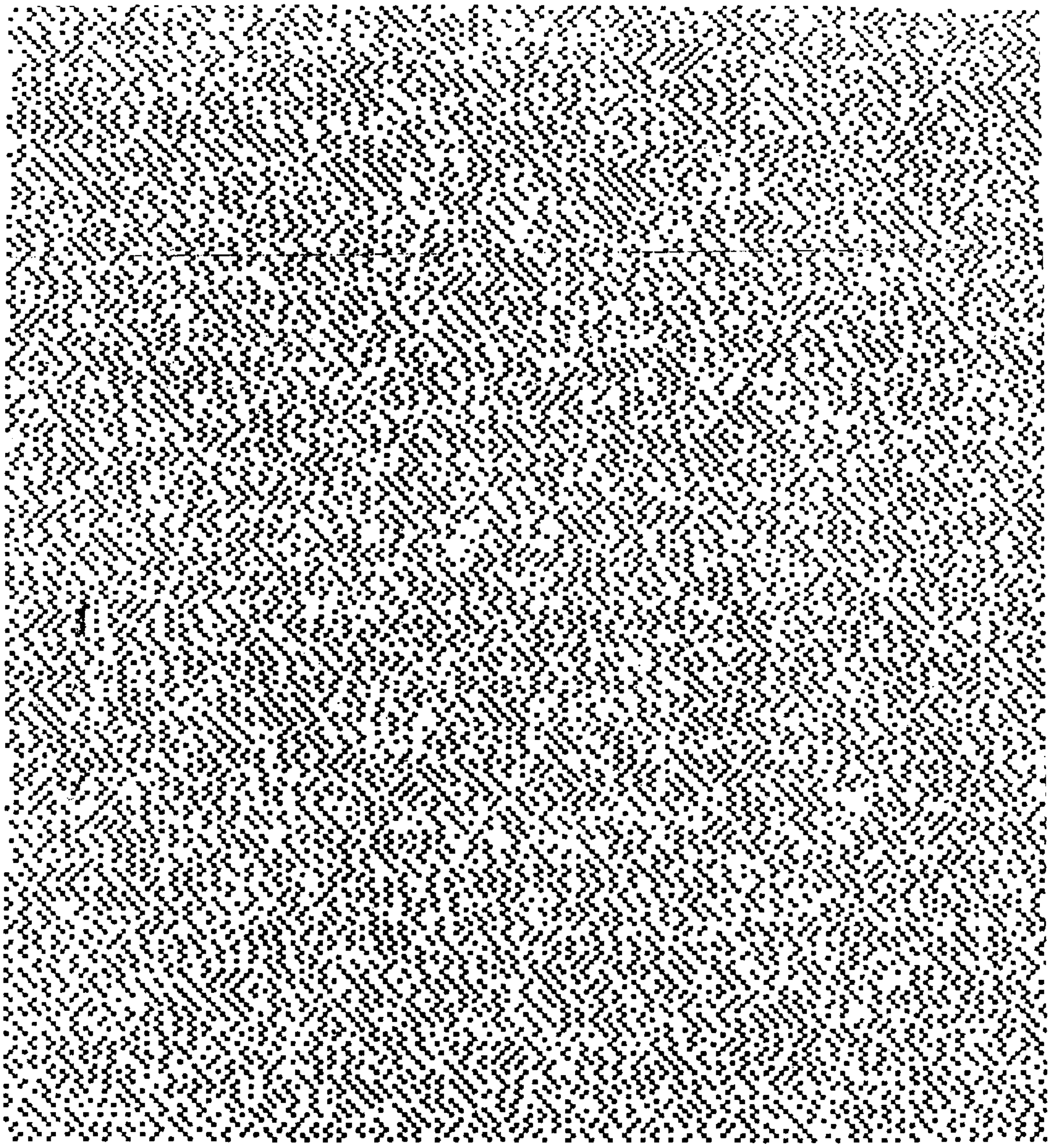
Figure 3B:
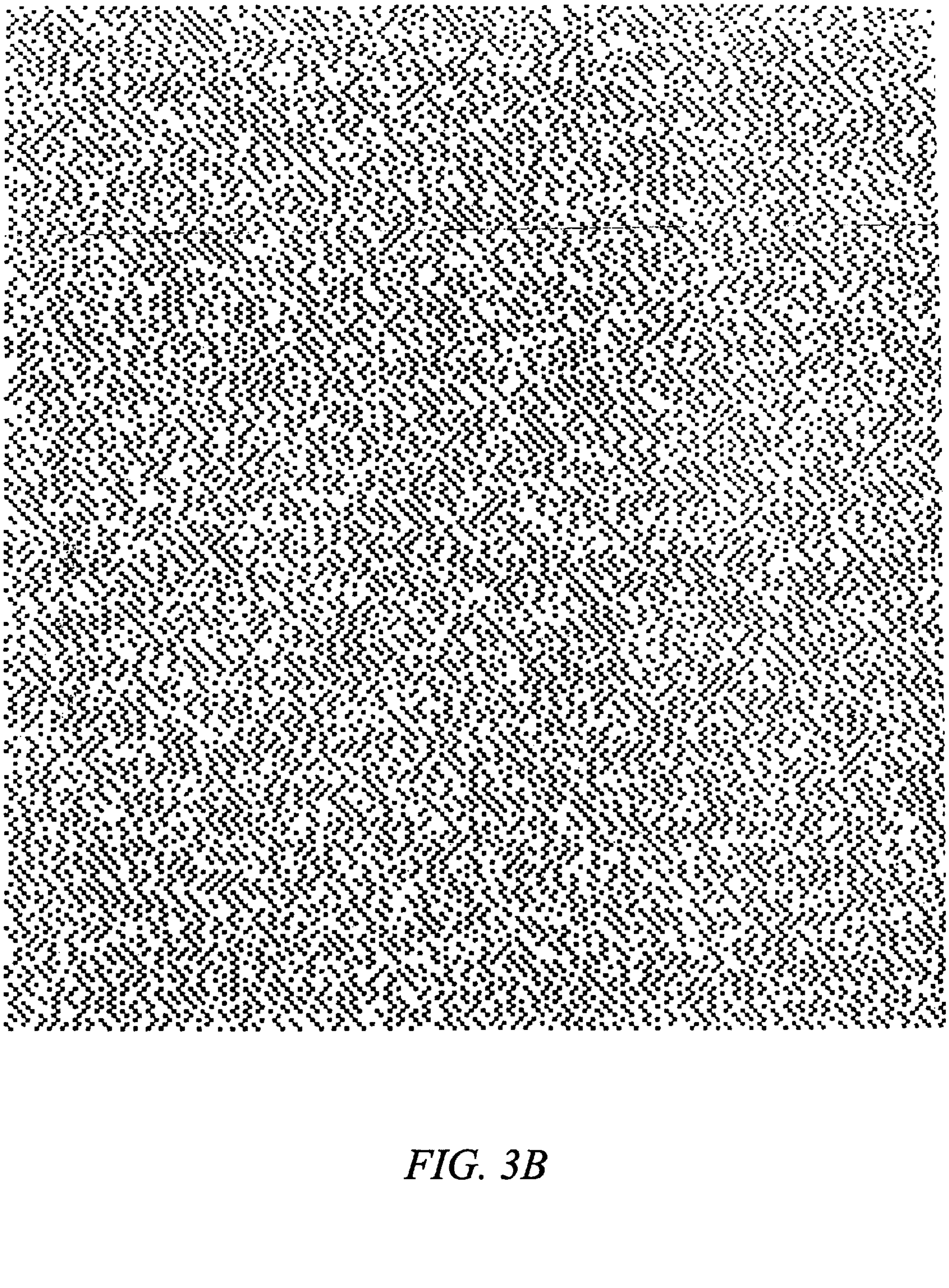
Figure 3C:
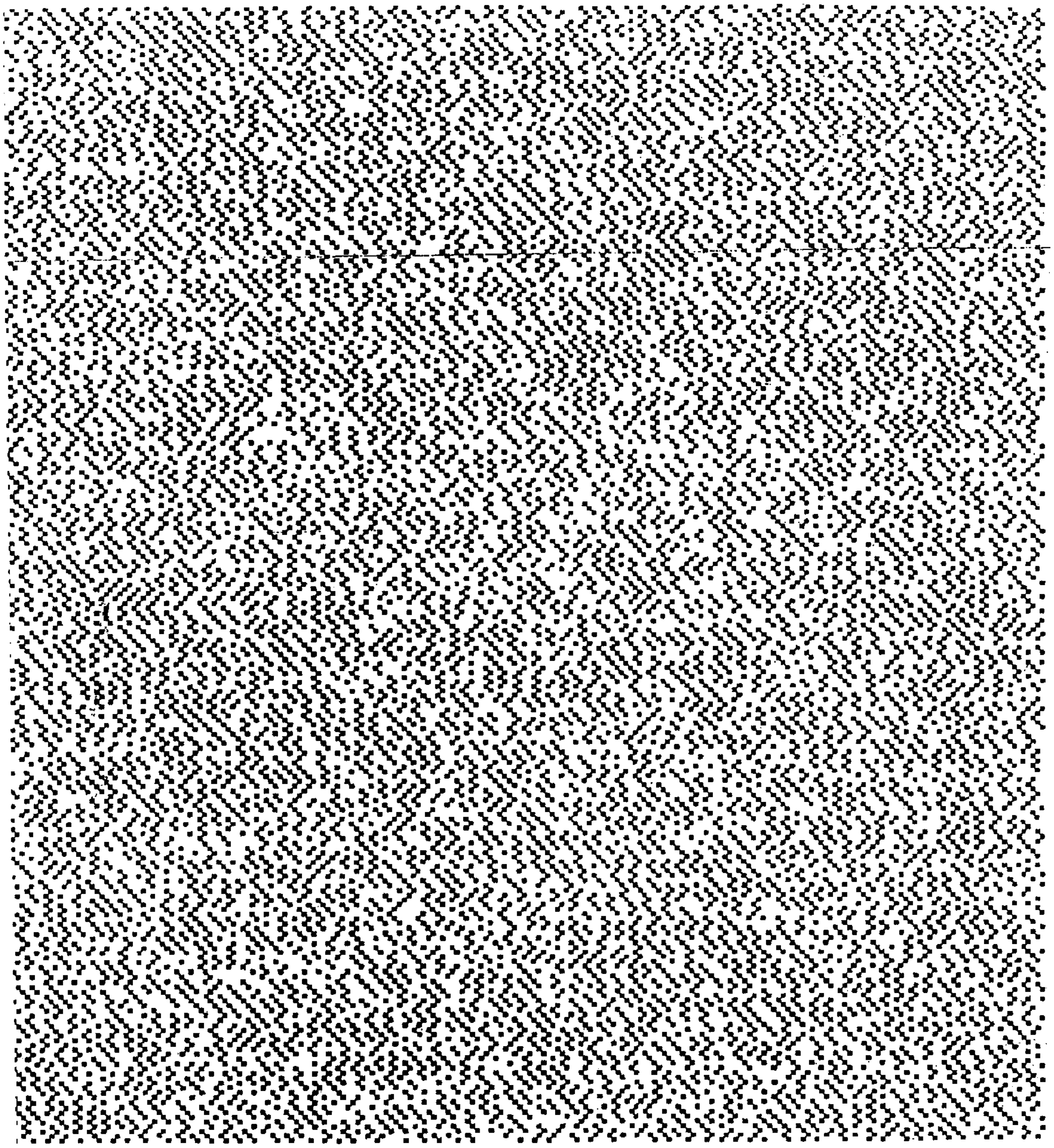
Figure 3D:
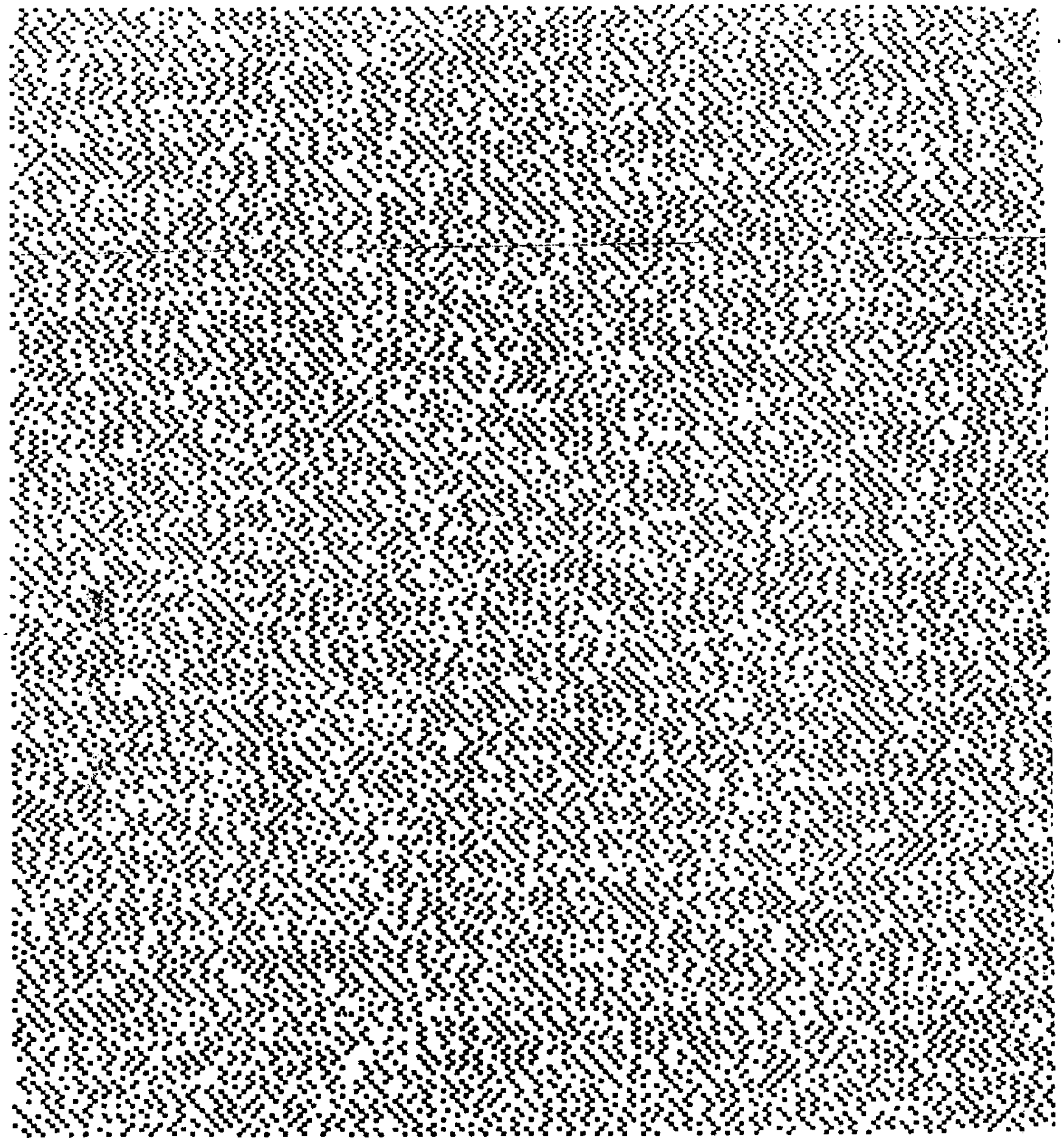

FIG. 2 is a flow diagram that represents an exemplary method embodiment of the invention. The method is referred to herein by the general reference number 200. The system 200 provides for generation of pseudo-random print-masks for inkjet printers.

At a step 201, receive image from image source.

At a step 202, set constraints.

At a step 203, initialize all entries in mask to indicate no pass has yet been selected and no pass number has been tried yet.

At a step 204, to determine the number of the pass on which a pixel in any column of any row of mask will be printed, randomly select a number between one and the number of passes to be made.

At a step 205, store pass number currently selected in data structure of pass numbers attempted in each column until row is completed.

At a step 206, if all pass numbers have been attempted for current column and column is first column in row, return to step 202, reset constraints, and repeat steps 202 through 206. If all pass numbers have been attempted for current column and column is not first column in row, back up one column and repeat steps 204 through 206 for pass numbers not already attempted at that column. If pass number currently selected has not been attempted, proceed to next step.

At a step 207, check whether pass number currently selected satisfies constraints. If yes, store pass number currently selected in mask and repeat steps 204 through 207 for next column of this row. If no, repeat steps 204 through 207 until sequence of pass numbers is selected that satisfies constraints, skip step 208 and proceed to step 209. If all pass numbers have been attempted at all previous columns and no sequence can be found which satisfies constraints, proceed to step 208.

At a step 208, if all constraints have already been reset within permissible limits or constraints cannot be reset for some reason, employ fuzzy logic or any other suitable technique to select sequence of pass numbers which optimize image quality and throughput within constraint limits. Store sequence of pass numbers selected and proceed to step 209.

At a step 209, repeat steps 204–208 until entire mask is generated.

At a step 210, repeat steps 204–209 until masks for entire image are generated.

At a step 211, send masks for entire image to printer for printing.

As an example only and without limitation, Table 1 set forth below shows an embodiment of the algorithm which accomplishes the method set forth herein:

TABLE 1

```
Algorithm in Detail:
We specify the algorithm for one color only. You can run the same algorithm for
other colors.
So we have following data structures.
// the actual mask
// MASK[i][j] stores the pass number which will be rendering this particular
color
// on "j"th pixel of "i" th row masked area.
// value of -1 indicates that the pixel has not been initialized
int MASK[band_height][band_width];
// passes which have been tried for a particular pixel
// if triedPasses[j][k] is TRUE then it means we have already tried "k"th pass
// otherwise not
// We just need to store this information for a single line only because we
would not
// backtrack to previous but rather fail.
Boolean triedPasses[band_width][number_of_passes];
    Algorithm:
    1. initialize all entries in MASK with -1 value and initialize entries of
triedPasses with FALSE
    2. for each row_no from 1 to band_height
        do
```

TABLE 1-continued

```
                current_column=1;
                done = FALSE
                while ( done is FALSE)
                do
                    if (current_column is 1) and all the entries in triedPasses[1] are
TRUE then
                        ALGORITHM FAILS; exit probably there are too many constraints
                    current_pass = number randomly selected between 1 and
number_of_passes;
                    if (triedPasses[current_column][current_pass] is FALSE)
                    {
                        // now we are going to try this pass
                        triedPasses[current_column][current_pass] = TRUE;
                        // check whether using current_pass with already evaluated MASK
values violates any constraint
                        // or not
                        if ( check_constraints(current_pass, row_no, current_column) is
TRUE)
                        {
                            // using this pass_number is ok
                            MASK[row_no][current_column]=current_pass;
                            // now decide for next column of this row
                            current_column+=1;
                            continue to the start of the while loop
                        }
                    }
                    /// otherwise try from passes which haven't been tried
                    for each pass_no whose triedPasses[current_column][pass_no] is FALSE
                    {
                        // we are now going to try this pass_no
                        triedPasses[current_column][pass_no]=TRUE;
                        // check whether using pass_no with already evaluated MASK values
violates any constraint
                        // or not
                        if ( check_constraints(pass_no, row_no, current_column) is TRUE)
                        {
                            // using this pass_number is ok
                            MASK[row_no][current_column]=pass_no;
                            if (current_column is BAND_WIDTH)
                            // all columns' values have been calculated for this line
                            done = TRUE;
                            // now decide for next column of this row
                            current_column+=1;
                            continue to the start of the while loop
                        }
                    }
                // we are here because none of the passes satisfied the constraints
                // that means we need to back trace
                    // since now existing MASK configuration will be changing
                    // so reset the triedPasses entries for this column
                    reset triedPasses[current_column] entries to FALSE
                    // now go back to the previous column and retry
                    current_column-=1;
                    continue to the start of while loop;
                done // while loop
            do // for loop
        3. check_constraints function
            Actually this function depends on the number of passes, and the quality
        requirements
            For a "j"th pixel of "i"th row, we check the value of the prospective
        pass_number with
            MASK[i][j-1], MASK[i][j-2], . . . , MASK[i][j-MIN_DISTANCE+1]
            where MIN_DISTANCE is the minimum required distance between the pixels which
        are rendered with a
            particular color in same pass. This value is dictated by firing frequency
        requirements and number
            of passes.
            For e.g for indoor ink:
            maximum carriage speed < (12.5 / mask pattern ratio)
            => maximum carriage speed/ 12.5 < (1/ mask pattern ratio)
            "Mask pattern ratio" is basically fraction of pixels covered by a mask. Since
        "mask pattern ratio"
            is guaranteed by having a minimum distance between pixels.
            Above formula gives:
            maximum carriage speed / 12.5 < (minimum distance between pixels)
            For driving printer into fastest speed which is (28.33 inches per second)
            This gives
            minimum distance between pixels > 2
            We check whether the above pixels are using same pass or different pass. If
```

TABLE 1-continued

```
they are using same pass,
    it implies that the constraints are violated.
    For quality purposes we also check whether the current pixel will have any
diagonal or vertical
    neighbor in current pass.
    For that we just need to check with:
    MASK[i-1][j-1], MASK[i-1][j]
    Also since the masks are tiled horizontally by the plotter before printing
so for the pixels near the last
    column of the mask we need to check with pixels near the first column due to
wrapping around.
    so we will check with
    MASK[i][band_width-j-MIN_DISTANCE], MASK[i][band_width-j-MIN_DISTANCE-1], . . .
, MASK[i][1]
    if (band_width - j > MIN_DISTANCE)
```

Those skilled in the art will recognize that Table 1 sets forth only one example of the algorithm which accomplishes the method set forth herein, and that many and various alternative embodiments can be devised which are within the concept, scope and spirit of this invention.

The following is an example of applying the above-described method and algorithm to the design of a simple mask. The process begins with mask generator 120 obtaining a digitized image, typically a bitmap, from image source 110.

Various constraints are set in constraint controller 122. One constraint is the size of the mask to be generated, typically a function of the resolution and throughput speed desired. "Size" as used herein refers to the number of pixels in the mask, not the physical dimensions of the mask. For this example, it will be assumed that two masks will be required, tiled horizontally across the page, each mask containing 10 pixels in a grid pattern of 5 columns by 2 rows. In actual practice, masks typically contain many thousands of pixel, but the example chosen is sufficient for illustrative purposes. The number of passes to be taken by the printer over each swath is selected, in this case 4 passes being chosen. Another constraint is the maximum pen-firing frequency recommended by its manufacturer for consistent and reliable operation, which is a function of the speed of the print head carriage and the density of the image (resolution) selected. In this instance, it will be assumed that this constraint will require that there be at least two pixels horizontally between pixels of the same color printed in the same pass. Further constraints regarding avoidance of bleeding are selected, in this instance meaning that no two pixels may be printed on the same pass if they are horizontally, vertically or diagonally adjacent.

Figure 4A:
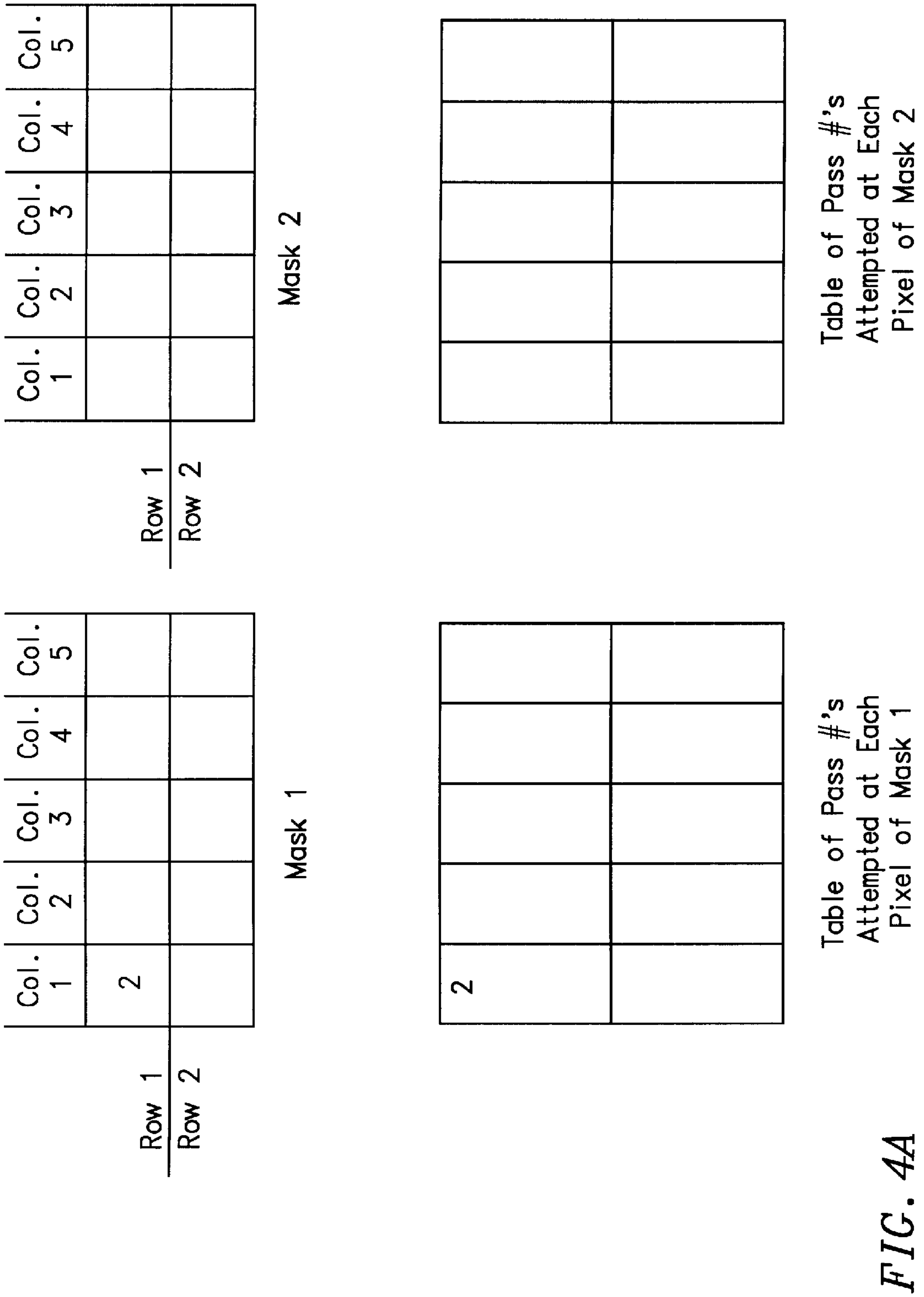
FIGS. 4*a* through 4*n* show, as examples only and without limitation, a sequence of pass numbers being recorded for the pixels of two simple masks according to the method and algorithm set forth herein.

Beginning with the first pixel of the first mask, at row 1, column 1, mask generator 120 obtains from random number selector 121 a number selected at random. Linkage of the range of all possible random numbers and the range of the number of passes (here, between 1 and 4) may be provided by means of a mathematical hash function. For this example, the first number selected at random is pass number 2. Mask generator 120 checks a table of pass numbers attempted at each pixel, verifies that pass number 2 has not been attempted yet at the first pixel, and records pass number 2 in the table. Mask generator 120 checks whether pass number 2 satisfies the selected constraints in constraint controller 122, and after determining that it does, records pass number 2 in the first mask at column 1, row 1, as shown in FIG. 4*a*.

Moving to column 2 of row 1, mask generator 120 obtains another randomly selected pass number, in this example pass number 1. Checking the table of pass numbers attempted at each pixel, mask generator 120 determines that pass number 1 has not yet been attempted for the second pixel, and records pass number 1 in the table of pass numbers attempted at each pixel. After verifying that pass number 1 satisfies the selected constraints in constraint controller 122, mask generator 120 records pass number 1 in the first mask at column 2, row 1, as shown in FIG. 4*b*.

Figure 4C:
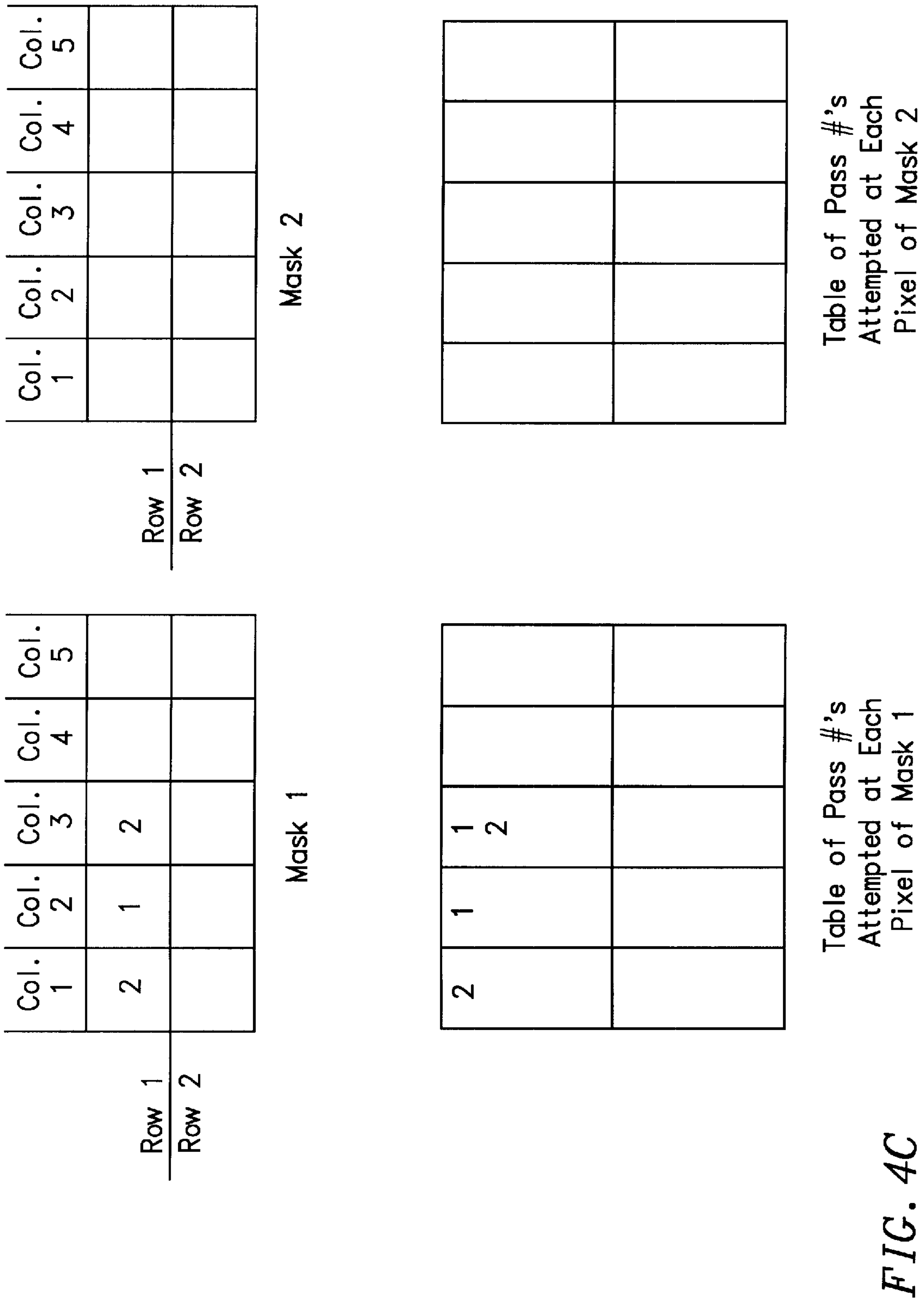

Moving to column 3 of row 1, mask generator 120 obtains a randomly selected number from random number generator 121, in this example pass number 1. Checking the table of pass numbers attempted at each pixel mask generator 120 determines that pass number 1 has not been previously attempted at the third pixel, then records pass number 1 in the table. Mask generator 120 then checks to see whether the number 1 satisfies the selected constraints in constraint controller 122, but discovers that a constraint is violated because pass number 1 has already been recorded for the second pixel in the first mask, and if pass number 1 is also recorded in the mask for the third pixel, then two horizontally adjacent pixels would be printed during the same pass. Mask generator 120 therefore obtains another randomly selected pass number from random number selector 121, in this case the number 2. Mask generator 120 verifies that pass number 2 has not already been attempted at the third pixel, and records pass number 2 in the table of pass numbers attempted at each pixel. Mask generator 120 then checks the selected constraints in constraint controller 122, and after verifying that pass number 2 does not violate any constraint, records pass number 2 in the mask at column 3, row 1, as shown in FIG. 4*c*.

By the same process, pass number 3 is recorded for column 4, row 1, as shown in FIG. 4*d*, and pass number 4 is recorded for column 5, row 1, thereby completing row 1 of the first mask as shown in FIG. 4*e*.

By the same process, at column 1, row 2, pass number 3 is recorded, as shown in FIG. 4*f*.

At column 2, row 2, pass number 2 is randomly selected on the first attempt, but fails to satisfy the constraint requiring that no two diagonally adjacent pixels be printed in the same pass, since pass number 2 has already been recorded in column 1, row 1, and column 3, row 1. Pass number 1 and then pass number 3 are randomly selected and attempted, but fail to satisfy constraints on vertically and horizontally adjacent pixels being printed on the same pass. On the next attempt, pass number 2 is selected at random again, but is immediately rejected as having already been attempted at that pixel. Finally, pass number 4 is randomly selected and, not having been attempted previously and satisfying all constraints, is recorded in the first mask at column 2, row 2, as shown in FIG. 4*g*.

At column 3, row 2, as shown in FIG. 4*h*, all 4 possible pass numbers are attempted and rejected as violating at least one constraint on printing adjacent pixels on the same pass: 1 violates the diagonally adjacent constraint with the 1 in column 2, row 1; 2 violates the vertically adjacent constraint with the 2 in column 3, row 1; 3 violates the diagonally adjacent constraint with the 3 in column 4, row 1; and, 4 violates the horizontally adjacent constraint with the 4 in column 2, row 2. Mask generator 120 therefore records no pass number for column 3, row 2.

Instead, as shown in FIG. 4*i*, mask generator 120 erases all entries for pass numbers attempted at column 3, row 2, and backs up one column to column 2, row 1, erases the pass number stored there, and checks to see if a different pass number will work there, as well as allow a pass number to be picked for the current pixel at column 3, row 2, which does not violate any constraint. However, the table of pass numbers attempted shows that all pass numbers have already been attempted at column 3, row 2, so mask generator 120 erases all the entries for pass numbers attempted there and backs up an additional column to column 1, row 2.

Now back at column 1, row 2, mask generator 120 obtains a randomly selected number from random number selector 121. The next randomly selected pass number is 3, but mask generator 120 rejects it because pass number 3 has already been attempted there. Obtaining randomly selected pass number 4 on the next attempt, mask generator 120 verifies that it has not been attempted before and that it satisfies all constraints, then records pass number 4 in column 1, row 2, as shown in FIG. 4*j*.

Moving forward again to column 2, row 2, pass number 2 is randomly selected. Because the previous pass numbers attempted there have been erased, pass number 2 is allowed to progress to the constraint checking step, where it fails because of the diagonally adjacent constraint. When pass number 1 is next randomly selected it fails the vertically adjacent constraint. And when pass number 4 is randomly selected next, although it was checked and verified and recorded previously in column 2, row 2, it now fails the horizontally adjacent constraint because mask generator 120 has backed up and changed the entry in column 1, row 2, to pass number 4. When pass number 3 is finally randomly selected for column 2, row 2, it satisfies the constraints and is recorded there, as shown in FIG. 4*k*.

Returning to column 3, row 2, where the current regression began, mask generator 120 again attempts various randomly selected pass numbers until it comes up with 4, which now satisfies the constraints and is recorded, as shown in FIG. 4*l*.

Similarly pass numbers 1 and 2 are selected, checked, verified and recorded in the last two pixels of the first mask, which is now complete, as shown in FIG. 4*m*.

Mask generator 120 next begins to fill in the second mask by the same process as the first mask, but now additionally considers the selected constraints with respect to border conditions where the two masks abut. Receiving from random number generator 121 a randomly selected pass number 2 for column 1, row 1 of the second mask, mask generator 120 determines that it does not work because pass number 2 has already been selected for column 5, row 2, of the first mask and would violate the diagonally adjacent constraint. Next receiving from random number generator 121 a randomly selected pass number 4 for column 1, row 1 of the second mask, mask generator 120 determines that it does not work either because pass number 4 has already been selected for column 5, row 1, of the first mask and would violate the horizontally adjacent constraint. When pass number 1 is selected it is checked, verified and recorded for column 1, row 1, of the second mask, as shown in FIG. 4*n*.

Skipping ahead, when mask generator 120 gets to column 1, row 2, of the second mask, neither 2 nor 4 can be selected. 2 would violate the horizontally adjacent constraint because 2 has already been recorded for column 5, row 2, of the first mask, and 4 would violate the diagonally adjacent constraint because 4 has already been recorded for column 5, row 2. Additionally, pass number 1 cannot be chosen for column 1, row 2, of the second mask because pass number 1 has already been selected for column 1, row 1, of the second mask, and would violate the vertically adjacent constraint. Thus, since pass number 1 was selected for column 1, row 1, of the second mask, and neither 2 nor 4 will work because of constraints at the boundary with the first mask, 3 will by process of elimination end up being selected as the pass number for column 1, row 2, of the second mask.

The process is repeated until the second mask is completed, after which mask generator 120 sends the two completed masks to printer 130 for printing.

The invention has general applicability to various fields of use relating to printers, copiers, and facsimile machines, whether stand-alone or networked, or any other type of device which creates images or text by incremental deposition of dots of colorant on a recording medium.

Further, the mask generation algorithm herein disclosed can be used in any case where multipass printing is involved in an inkjet printer and their constraints related to:

(a) Spacing of the individual pixels of a mask;

(b) Restriction regarding rendering of a same pixel by two separate inks in the same pass; and (c) Any other restriction dictated by print-quality or plotter hardware which prohibit some of the masks allowable because of the above constraints.

Because most inkjet printers perform multipass printing, the masks used in any currently available inkjet printer can be constructed using the algorithm herein.

It should be noted that the mask generation algorithm herein disclosed is complete. This means that if there is a mask satisfying the constraints specified above, it is possible to find a mask irrespective of the complexity involved. If there is no such mask possible, the algorithm also provides this information.

Thus, the mask generation algorithm can be used to determine if the plotter hardware imposes any unreasonable constraints which hinders construction of good quality mask. This aspect of the invention is used to improve the plotter hardware.

Although preferred embodiments are disclosed herein, many variations are possible which remain within the concept, scope, and spirit of the invention, and these variations would become clear to those skilled in the art after perusal of this application.

What is claimed is:

1. A method of generating printmasks for printing by a printer, comprising:

receiving an image to be printed;

selecting a mask size;

selecting a number of passes to be made by a print head over each swath of said image to be printed;

selecting at least one constraint on a location of a second dot of ink to be placed during one of said number of passes relative to a location of a first dot of ink placed during a different one of said number of passes;

selecting randomly a first pass number between one and said number of passes for a first pixel of said mask;

checking said first randomly selected pass number to see if said first randomly selected pass number violates said at least one constraint;

recording said first randomly selected pass number in said first pixel of said mask;

selecting randomly a second pass number between one and said number of passes for a second pixel in said mask;

checking said second randomly selected pass number to see if said second randomly selected pass number violates said at least one constraint;

recording said second randomly selected pass number in said second pixel of said mask; and, repeating said steps until a pass number is recorded for every pixel of said mask.

2. A method as in claim 1, wherein said number of passes applies to each color to be printed.

3. A method as in claim 1, wherein said at least one constraint comprises:

a prohibition on printing horizontally adjacent pixels in a same one pass, a prohibition on printing vertically adjacent pixels in a same one pass, a prohibition on printing diagonally adjacent pixels in a same one pass, a prohibition on exceeding a selected maximum firing rate for a pen in said print head.

4. A method as in claim 3, wherein said same one pass includes borders between said masks in a swath.

5. A method as in claim 1, wherein each of said constraints may be overridden except said prohibition on exceeding a selected maximum firing rate for a pen in said printer head.

6. A method as in claim 1, wherein said printer comprises:

a single layer printer, a multi-level printer, an ink jet printer, a bubble jet printer, or a laser printer.

7. A mask generated in accordance with the method of claim 1.

8. A method as in claim 1, wherein said each color comprises cyan, magenta, yellow and black.

9. A method as in claim 1, wherein said randomly selecting a pass number is performed offline by an image source.

10. A method as in claim 1, where said image source is a computer, a scanner, or a facsimile machine.

11. A method as in claim 1, wherein said randomly selecting a pass number is performed by said printer.

* * * * *